Niklas

[15] 3,643,495
[45] Feb. 22, 1972

[54] PROGRAMMED ULTRASONIC PULSE-ECHO APPARATUS FOR FLAW SIZE INDICATION IN MATERIALS TESTING

[72] Inventor: Ludwig Niklas, Lovenich near Cologne, Germany
[73] Assignee: Dr. J.U.H. Krautkramer Gesellschaft Fur Elektrophysik, Luxemburger, Germany
[22] Filed: Mar. 23, 1970
[21] Appl. No.: 21,921

[30] Foreign Application Priority Data

Mar. 28, 1969 Germany ............... P 19 15 833.9

[52] U.S. Cl. .................................. 73/67.9, 73/71.5
[51] Int. Cl. .................................................... G01n 29/00
[58] Field of Search .................... 73/67.5–67.9, 71.5

[56] References Cited

UNITED STATES PATENTS 3,048,031  8/1962  Beaujard et al. .................. 73/67.8
3,135,942  6/1964  Tucker et al. ..................... 340/3

Primary Examiner—Richard C. Queisser
Assistant Examiner—Arthur E. Korkosz
Attorney—Harry E. Aine

[57] ABSTRACT

In an ultrasonic pulse-echo apparatus for nondestructive materials testing, particularly for flaw size determination, flaw size is determined by the reflected echo intensity as analyzed by means of programmable circuit modules the output of which is readout in terms of the flaw distance on the scale or similar means of an indicator instrument.

8 Claims, 5 Drawing Figures

PROGRAMMED ULTRASONIC PULSE-ECHO APPARATUS FOR FLAW SIZE INDICATION IN MATERIALS TESTING

BACKGROUND OF THE INVENTION

In practical materials testing it is not enough to know whether a sound-reflecting discontinuity, a "flaw" is contained in the workpiece or not, but it is important to be able to determine its site (diameter). The physical interrelations between sound amplitude of the echo, the ultrasound frequency, the flaw—to probe distance $a$, and the probe diameter are known (See, for example, "Ultrasonic Testing of Materials" by J. and H. Krautkramer, translation of the second revised German edition, published by Springer, Berlin, section 1.84). The conventional DGS-Diagram, such as shown in FIG. 1 hereof, shows this interrelation. However, employment of such a diagram implies reproducible adjustment or readout of the echo amplitude, the flaw distance and the sound frequency on the pulse-echo apparatus. Units of recent design meet with this requirement by calibration of the gain setting controls (mostly in db.), by prerating the transmission pulse frequency and the transmission band of the amplifier by preset switch-selected circuit elements and by presetting the rise time of the sweep voltage from the sweep stage by a reproducible setting element, so that the flaw distance can be directly read on the luminous screen of the cathode-ray tube.

Moreover, provisions are known to enable simplification of operating the units and speeding up the procedure in flaw size determination. For example, a "DGS-Scale" is such an auxiliary means. The DGS-Scale comprises a diagram similar to the one shown in FIG. 1 which is placed as a transparent scale over the luminous screen of the cathode-ray tube, and thus the flaw size can be read directly from the echo amplitude and the echo location on the time base (flaw distance).

Another auxiliary means for determining flaw size is known as "swept gain." This means taps an impulse from the timing pulse generator which is appropriately shaped in a pulse converting stage and then fed to the amplifier as an electric AGC voltage. The purpose of this means is to increase the gain of the amplifier in proportion to the flight time of the pulse and thus in dependence on the flaw distance so that the drop in echo amplitude, depending on the distance, is just compensated by an increase of gain depending on the flight time. The result is that, on the CRT-screen, the echo amplitude always corresponds to the flaw size and is not dependent on the flaw distance.

But all these auxiliary means for determining flaw size have a common considerable disadvantage: only if the regulating means are set for a particular specimen under test, for a particular probe, and for each other is the proper test result obtained. In addition to setting the regulation controls for the principal functions of the apparatus other, not specially mentioned, settings must be executed at the apparatus, for example, the monitor setting for operation with separate transmitter and receiver probe, an isolating switch for the lead from pulse sender to the amplifier, the focus, the brilliance for the CR tube, etc. Due to the multitude of settings necessary prior to actual testing, a nonexperienced test operator having no or only superficial knowledge of the performance of the apparatus is overdemanded. Even a specialist runs the considerable risk of missetting the adjustments due to carelessness or negligence. In practice this results quite often in grave misratings in materials testing.

SUMMARY OF THE PRESENT INVENTION

According to the present invention, the disadvantages are prevented by mounting the regulating elements for nominal frequency, test range and/or swept gain on a common exchangeable plug-in unit. With a single adjustment procedure, these regulating elements are adjusted and secured corresponding to a certain probe-type and CRT-screen scale. The probe-type designation is expediently clearly labeled or the like on the plug-in unit. The user of the apparatus then needs only to make certain prior to beginning operations that the type designation, such as numerical type marking, is identical on the scale, the probe and the plug-in unit. He then has surely realized the proper setting.

This necessary check for compliance of the type designation may also be automated in that according to the present invention the plug-in unit as well as the probe and the scale have some vacant contacts in their connectors which may be connected with each other in many ways by shorting bridge wires. More particularly, the contacts of these three plug connections are series connected, providing that a current can flow only when the bridging by the shorting bridge wires is the same at all three connectors (coding of the numerical mark), which then releases the necessary operation voltage for operating the apparatus. If this contact combination does not comply with each other, it means the user has made an error in selecting the numerical type marks and the apparatus is not in working order. Other programming units, such as punch cards can also be used instead of connectors with shorting links. As an alternative, the interlocking is made purely mechanical after the keylock principle.

Other features and advantages of the present invention will become apparent upon a perusal of the following specification taken in connection with the accompanying drawings wherein:

DESCRIPTION OF THE PREFERRED EMBODIMENTS

Figure 1:
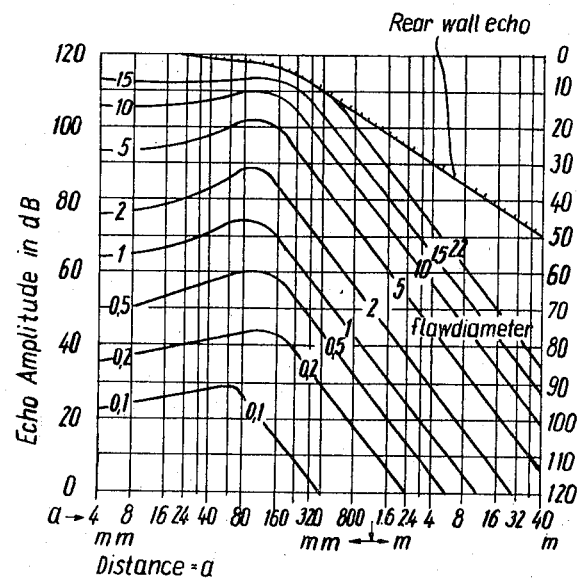
FIG. 1 is a DGS-diagram depicting the interrelationship of probe diameter, sound amplitude of the echo, ultrasound frequency and probe to flaw distance for an ultrasonic flaw testing apparatus.

Referring now to FIG. 1, a timing pulse generator 1, such as a multivibrator circuit, determines the repetition frequency of the ultrasonic pulses. This generator triggers the pulse sender 2, which feeds electric pulses to the electroacoustic transducer 3, the "probe," which in turn transforms them to ultrasound pulses and then transmits them in the work piece under test. Echoes reflected from flaws are picked up again by the probe 3, transformed to electric echo pulses and amplified in the amplifier 4, for display on a cathode-ray tube 5 and/or by means of a monitor 7 (see section 2.35 of the aforecited text). A sweep generator 6 generates a time base for the C.R. tube 5 which is synchronized by the output of the pulse generator 1.

To enable reproducible adjustment or readout of the flaw distance and sound frequency at the pulse-echo apparatus, gain regulating elements 8, typically calibrated in db., transmitter pulse frequency regulating elements 9a, and regulating instrument 9b for regulating the transmission range of the amplifier, are provided and designed as preset circuit elements which may be switch selectable. Moreover, a reproducible regulating element 11 for regulating the rise time of the sweep voltage from the sweep generator 6 is available to enable presetting such rise time.

A sample of the output of the timing pulse generator 1 is shaped appropriately in a pulse converter stage 10, and then is fed to the amplifier 4 as an electric automatic gain control voltage for an auxiliary means known as "swept gain."

Figure 3:
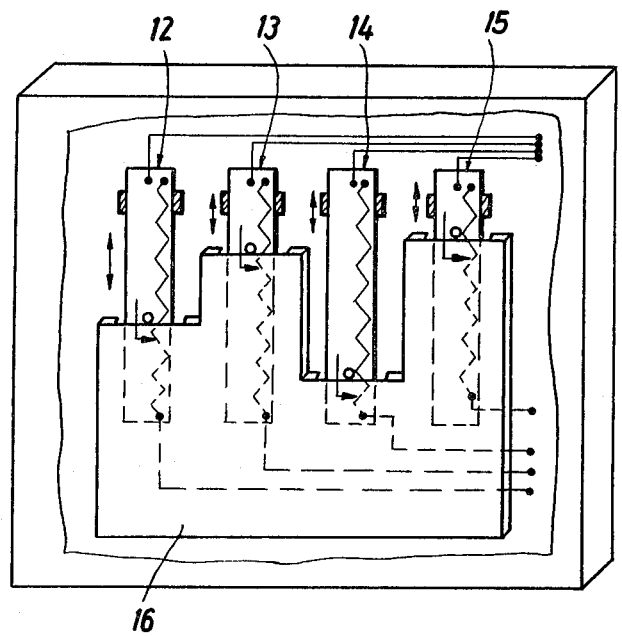
FIG. 3 is a schematic perspective view, partially in cross section of a circuit module of the present invention for common coordinated setting of several individual modules.

In one embodiment of the present invention as shown in FIG. 3, a common coordinated setting of several regulating elements 12, 13, 14, 15 is demonstrated. These regulating elements may, for example, be designed as linear potentiometers and are jointly adjusted to the respective appropriate value by means, for example, of a comblike mechanical template 16, the respective square projection of the template shifting the associated trimmer potentiometer to a position as, for example, shown in FIG. 3, by means of the projecting control member of the potentiometer.

Figure 4:
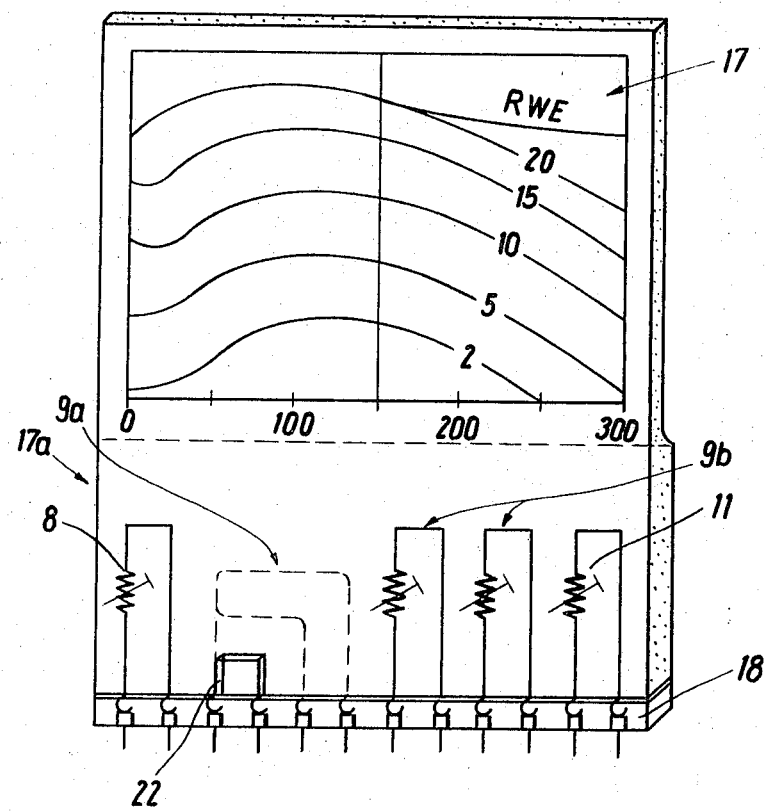
FIG. 4 is a schematic perspective view of an alternative circuit module to that of FIG. 3, whose upper portion is constituted by a DGS-scale and the lower portion by a punch card-type plug-in unit.

Another embodiment of the present invention provides for better prevention of the risk of missetting (see FIG. 4) by integrating the critical regulation elements 8, 9b, 9a, 10 and 11 of the DGS-scale equipped version of the apparatus into a mechanical unit including the DGS-scale, thus making certain that they can be exchanged only together with this scale. Two appropriate versions are represented in FIG. 4.

In a first version, a punched card 17a, as it is used in the computer technology for example, is attached at the bottom of the DGS-scale 17. Through the connector or multipin connector 18 the regulating elements 8 through 11, corresponding to those of FIG. 1, are connected to the appropriate modules of the apparatus.

In a second version the regulating elements, such as exemplified by 9a, are mounted in the apparatus. The regulating element associated with the scale is selected, for example, by shorting links 22 bridging the contacts of the multipin connector. Instead of connectors with shorting links, other programming devices such as punch cards with scanner may be used. Provided that, when producing such a scale, the regulating elements are once accurately adjusted and secured, the user of the apparatus is certain to have realized the proper apparatus setting when inserting the scale. This precluded wrong setting due to ignorance or carelessness of the user of the apparatus.

Figure 2:
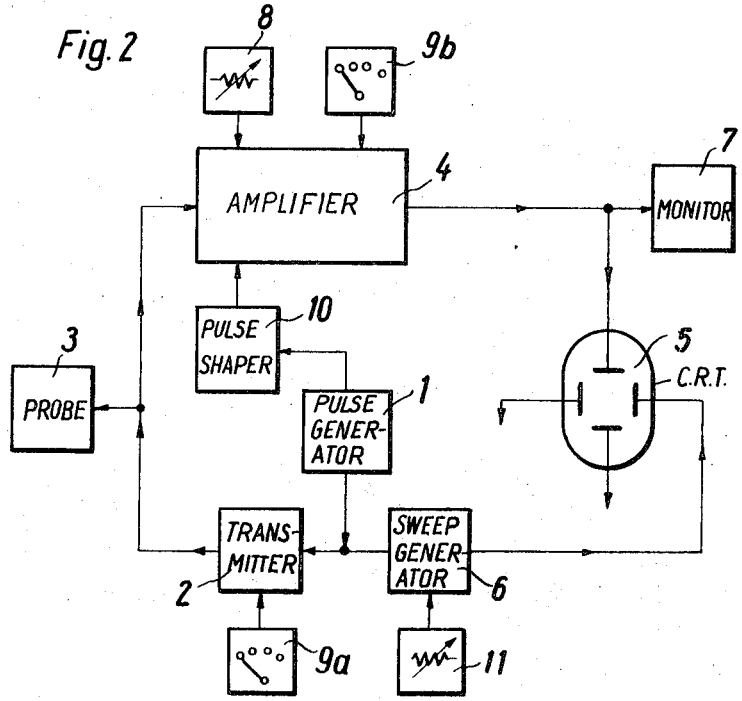
FIG. 2 is a schematic block diagram of a conventional materials testing apparatus according to the pulse echo method.

When the pulse-echo apparatus is equipped with the auxiliary means "swept gain" instead of the auxiliary means "DGS-scale," the regulating elements 8 through 10 in FIG. 2 need be readjusted appropriately upon exchange of probe 3. With this execution probable wrong setting of the sweep generator 6 causes no misreading, since the distance dependence of the detection sensitivity is compensated by the component part 10 for swept gain.

Figure 5:
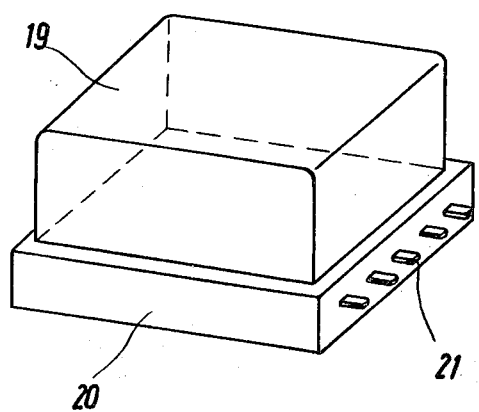
FIG. 5 is a perspective view of a protective probe encasement provided for an auxiliary circuit module for providing swept gain.

To prevent, in this case, the previously mentioned disadvantages, according to the present invention, the regulation elements 8 through 10 in FIG. 2 are integrated as a part of the probe 3 as a unitary mechanical element. Due to the necessary space for arranging the regulating elements and the necessary multi-pin connectors, such a probe may become too clumsy for practical use. But this problem is solved by a special arrangement, i.e., the regulating elements are not housed in the probe 3 itself but in the protective case of the probe. FIG. 5 demonstrates this arrangement. The protective case is composed of the hood 19 and the bottom 20. The bottom 20 is hollow to provide housing of the regulating elements, which are connected with the apparatus through a multipin connector 21. In an alternative arrangement, the regulating elements may also be arranged in the apparatus and be selected or actuated by means of devices in the probe 3, or in the protective probe case.

In use, the user receives the advice to take the probe 3, from the protective case and to connect it to the apparatus and to plug the case itself into a connector provided at the apparatus. This provides, necessarily, proper setting of the apparatus. When the user puts back a probe into the appropriate protective case, immediately after use, what he should do anyway to prevent damaging by shock, impact or excessive soiling, probes and cases never can be confused. Another possibility demanding less from the tidiness of the user is to connect the probe and the component part housing the regulating elements by a cord or a chain.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an ultrasonic pulse-echo apparatus for nondestructive materials testing for flaw size determination from the reflected echo intensity, such ultrasonic pulse-echo apparatus having a plurality of variable operating parameters, probe means for coupling ultrasonic pulses into and out of the material under test, indicator means responsive to the echo-pulse returned from a flaw for displaying a signal representative of the flaw on a scale as a function of flaw distance, programming means including a plurality of interchangeable plug-in units for correlating a plurality of the operating parameters of the pulse-echo apparatus for a plurality of different ones of said probe means, whereby proper calibration of the apparatus is facilitated to minimize operator time and errors.

2. The apparatus of claim 1 wherein said plug-in units include preset elements for correlating at least one of the parameters of, ultrasonic frequency, test range, and swept gain for a plurality of different probes.

3. The apparatus of claim 1 wherein said programming means programs the ultrasonic frequency, and test range operating parameters.

4. The apparatus of claim 1 wherein said programming means programs the ultrasonic frequency and swept gain operating parameters.

5. The apparatus of claim 1 wherein said programming means includes interlocking means for switching in only the appropriate circuit elements determinative of programmed operating parameters with an appropriate probe and appropriate indicator scale.

6. The apparatus of claim 5 wherein said interlocking means is affixed as a unit to said indicator scale such that exchanging a first indicator scale with a second and different indicator scale results in a corresponding change in the programmed operating parameters to correlate the second scale with a second set of operating parameters.

7. The apparatus of claim 5 wherein said interlocking means is affixed as a unit to said probe such that exchanging a first probe with a second and different probe results in a corresponding change in the programmed operating parameters to correlate the second probe with a second set of operating parameters.

8. The apparatus of claim 5 including casing means for encasing said probe means, and wherein said interlocking means is affixed as a unit to said probe casing means.

* * * * *